United States Patent
Zhang et al.

(10) Patent No.: US 8,811,505 B2
(45) Date of Patent: Aug. 19, 2014

(54) RADIO CHANNEL MODEL FOR ICI CANCELLATION IN MULTI-CARRIER SYSTEMS

(75) Inventors: Xiabo Zhang, Shanghai (CN); Ni Ma, Shanghai (CN)

(73) Assignee: NXP, B.V., Eindhoven (NL)

( * ) Notice: Subject to any disclaimer, the term of this patent is extended or adjusted under 35 U.S.C. 154(b) by 225 days.

(21) Appl. No.: 13/057,233

(22) PCT Filed: Aug. 4, 2008

(86) PCT No.: PCT/CN2008/001419
§ 371 (c)(1),
(2), (4) Date: Feb. 2, 2011

(87) PCT Pub. No.: WO2010/015101
PCT Pub. Date: Feb. 11, 2010

(65) Prior Publication Data
US 2011/0135018 A1    Jun. 9, 2011

(51) Int. Cl.
*H04K 1/10* (2006.01)
*H04L 27/28* (2006.01)

(52) U.S. Cl.
USPC .......................................... 375/260; 375/259

(58) Field of Classification Search
USPC ........................................................ 375/260
See application file for complete search history.

(56) References Cited

U.S. PATENT DOCUMENTS

| | | | |
|---|---|---|---|
| 6,400,761 B1 | 6/2002 | Smee et al. | |
| 6,970,560 B1 | 11/2005 | Hench et al. | |
| 7,826,517 B2 * | 11/2010 | Kim et al. | 375/148 |
| 7,844,018 B2 * | 11/2010 | Tian et al. | 375/346 |
| 2002/0146063 A1 * | 10/2002 | Gorokhov et al. | 375/148 |
| 2002/0186756 A1 * | 12/2002 | Kolze et al. | 375/152 |
| 2005/0141649 A1 | 6/2005 | Tanabe | |
| 2005/0147176 A1 * | 7/2005 | Yun et al. | 375/260 |
| 2007/0206689 A1 | 9/2007 | Koo et al. | |
| 2007/0211685 A1 * | 9/2007 | Swarts et al. | 370/342 |
| 2008/0101484 A1 * | 5/2008 | Wu et al. | 375/260 |
| 2008/0240268 A1 * | 10/2008 | Yu et al. | 375/260 |
| 2010/0008433 A1 * | 1/2010 | Huang et al. | 375/260 |

FOREIGN PATENT DOCUMENTS

| | | |
|---|---|---|
| CN | 1514557 A | 7/2004 |
| CN | 1750527 A | 3/2006 |
| EP | 1748612 A1 | 1/2007 |
| WO | 2005117381 A1 | 12/2005 |
| WO | 2006132589 A2 | 12/2006 |
| WO | 2010015101 A1 | 2/2010 |

OTHER PUBLICATIONS

Zhao, Y., et al; "Sensivity to Doppler Shift and Carrier Frequency Errors in OFDM Systems—The Consequences and Solutions"; IEEE 46th Vechcular Techn. Conf., Atlanta, GA, US; pp. 1564-1568 (1996).

(Continued)

*Primary Examiner* — Erin File

(57) ABSTRACT

A channel modeling method for Inter Carrier Interference (ICI) cancellation in multi-carrier wireless communication systems comprises: describing the channel with a plurality of fixed matrices and an equal-numbered plurality of unfixed variables; one-to-one pairing each of the described plurality of unfixed variables with one of described plurality of fixed matrices. Corresponding system is also provided. The method and system can compensate for the channel distortion of the Doppler Effect even if the Doppler Frequency Offset is relatively significant.

20 Claims, 4 Drawing Sheets

(56) References Cited

OTHER PUBLICATIONS

Jeon, Won Gi; "An Equalization Technique for Orthogonal Frequencydivision Multiplexing Systems in Time-Variant Multi-Path Channels"; IEEE Transactions on Communications, vol. 47, No. 1 (Jan. 1999).

Armstrong, Jean; "Analysis of New and Existing Methods of Reducing Inter-Carrier Interference Due to Carrier Frequency Offset in OFDM"; IEEE Transations on Communications, vol. 47, No. 3; pp. 365-369 (Mar. 1999).

Choi, Yang-Seok; "On Channel Estimation and Detection for Multicarrier Signals in Fast and Selective Rayleigh Fading Channels"; IEEE Transactions on Communications, vol. 49, No. 8; (Aug. 2001).

Nakamura, Mitsuru, et al; "New Estimation and Equalization Approach for OFDM Under Doppler Spread Channel"; 13th IEEE Intl Symp on Personal, Indoor and Mobile Radio Comm, vol. 2; IEEE, Piscataway, NJ, USA; pp. 555-560 (2002).

Nakamura, Mitsuru, et al; "A Study on an MMSE ICI Canceller for OFDM Under Doppler-Spread Channel"; 14th IEEE 2003 Intl Symp on Personal, Indoor and Mobile Radio Comm, vol. 1; IEEE, Piscataway, NJ, USA; pp. 236-240 (2003).

Chen, Shaoping, et al; "Intercarrier Inteference Suppression and Channel Estimatin for OFDM Systems in Time-Varying Frequencyselective Fading Channels";IEEE Transactions on Consumer Electronics, vol. 50, Issue 2; pp. 429-435 (May 2004).

Cui, Tao, et al; "Low-Complexity Pilot-Aided Channel Estimation for OFDM Systems Over Doubly-Selective Channels"; IEEE Intl Conf on Communications 2005, vol. 3; pp. 1980-1984 (May 2005).

"Chang, Kapseok; "Cancellation of ICI by Doppler Effect in OFDM Systems"; IEEE VTC (2006)".

"3GPP; "TR 25.814V1.22—Physical Layer Aspects of Evolved UTRA" 108 Pages(2006)".

Huang, Xiaozhou, et al; "ICI Coefficeint Estimation for OFDM Systems in Mobile Channels"; Global Telecommunications Conference 2006; 5 Pages (Dec. 1, 2006).

Sheu, Chorng-Ren; "A Low-Complexity Concatenated ICI Cancellation Scheme for High-Mobility OFDM Systems"; IEEE WCNC; 5 Pages (2007).

Banelli, Paolo, et al; "Data-Aided Kalman Tracking for Channel Estimation in Doppler-Affected OFDM Sytems"; Acoustics, Speech and Signal Processing 2007 IEEE Intl Conf on, vol. 3; 4 Pages (Apr. 2007).

Jian, Qi, et al; "Pilot-Assisted OFDEM Channel Estimation and ICI Cancellation for Double Selective Channels"; Proceedings of IEEE GLOBECOM 2007; pp. 4150-4154 (Nov. 26, 2007).

Hijazi, et al; "Time-Varying Channel Complex Gains Estimation and ICI Supression in OFDM Systems"; GLOBECOM 2007—IEEE Global Telecommunications Conference, IEEE, Piscataway, NJ, US; pp. 4258-4262 (2007).

Li, Rui, et al; "Iterative Receiver for MIMO-OFDM Systems With Joint ICI Cancellation and Channel Estimation"; IEEE, Piscataway, NJ, US; 6 Pages (2008).

International Search Report and Written Opinion for Intl Application PCT/CN2008/001419 (May 14, 2009).

\* cited by examiner

RADIO CHANNEL MODEL FOR ICI CANCELLATION IN MULTI-CARRIER SYSTEMS

The present invention relates generally to communication systems and more particularly to a novel radio channel model for Inter Carrier Interference (ICI) cancellation in multi-carrier systems.

In multi-carrier systems, a symbol duration is increased by splitting the high-rate serial data stream into many low-rate parallel streams. As illustrated in FIG. 1, in orthogonal frequency division multiplexing (OFDM), for example, a stream of signals are modulated on many equally spaced parallel subcarriers. Modulation and demodulation are implemented by means of Inverse Fast Fourier Transform (IFFT) 101 and its inverse (FFT) 102, respectively. The orthogonality of the signals, when transmitted over a radio channel, can only be maintained if the channel is flat and time-invariant. For time-varying channels self-interference occurs, among others, among signals at different subcarriers and is called Inter Carrier Interference (ICI). Some proposed solutions for ICI mitigation require a modification to the transmit format and are thus not suitable for existing standards. Others without this requirement cannot be used due to high speed of the user devices, e.g., when used in a vehicle, train or plane at their normal cruising speeds, while still others are too complex for a typical mobile user electronic device.

As shown in FIG. 1 an OFDM system is an example of a multi-carrier system in which the frequency domain signals are transformed into a time domain by an IFFT module 101:

$$s(n) = \sqrt{\frac{1}{N}} \sum_{k=0}^{N-1} d_k e^{j2\pi nk/N} \quad (-(N-1) \leq n \leq N-1) \quad \text{Equation 1}$$

The received signal $y(n)$ can be expressed as:

$$y(n) = \sum_{l=0}^{L} h(n, l)s(n-l) + w(n) \quad \text{Equation 2}$$

Replacing $s(n)$ with Equation 1, Equation 2 can be rewritten as:

$$y(n) = \sqrt{\frac{1}{N}} \sum_{k=0}^{N-1} d_k H_k(n) e^{j2\pi nk/N} + w(n) \quad \text{Equation 3}$$

where $$H_k(n) = \sum_{l=0}^{L} h(n, l)e^{-j2\pi lk/N}$$

and L is the maximum multipath number. The $k^{th}$ sub-carrier output from the FFT module 102 can be expressed as $$Y_k = \sqrt{\frac{1}{N}} \sum_{k=0}^{N-1} y(n)e^{-j2\pi nk/N} = d_k H_k + \alpha_k + w_k \quad \text{Equation 4}$$

where $$H_k = \frac{1}{N}\sum_{n=0}^{N-1} H_k(n) \quad \text{Equation 5}$$

$$\alpha_k = \frac{1}{N}\sum_{m=0, m\neq k}^{N-1} d_m \sum_{n=0}^{N-1} H_m(n)\exp[j2\pi n(m-k)/N] \quad \text{Equation 6}$$

$$w_k = \sqrt{\frac{1}{N}} \sum_{n=0}^{N-1} w(n)e^{-j2\pi nk/N} \quad \text{Equation 7}$$

The $d_k H_k$ is the expected received signal and the $\alpha_k$ represents Inter-Carrier Interference (ICI) caused by the time-varying nature of the channel. $w_k$ is white Gaussian noise. Thus, ICI is structured according to the transmit standard.

The ICI is a significant problem for multi-carrier systems, especially in a high mobility environment. As an inherent interference within OFDM-based systems, ICI results from incomplete orthogonality of the sub-carriers, which is caused by several factors, e.g., carrier frequency offset between transmitter and receiver, Doppler Effect, etc. The mobile radio channel brings the spectrum spread to the received signals. When a pure sinusoidal tone of frequency $f_c$ is transmitted, the received signal spectrum, called as Doppler spectrum, will have components in the range $f_c-f_m$ to $f_c+f_m$, which is shown in FIG. 2.

Considering one sub-carrier on the receiving side, the data on one sub-carrier is interfered with by the data on other sub-carriers, as described by the following Equations 8 and 9

$$d_l' = c_0 d_l + \sum_{\substack{i=0-N \\ l\neq i}} c_{l-i} d_i \quad \text{Equation 8}$$

where $d_i$ is transmitted data, $d_l'$ is the corresponding received data, $c_{l-i}$ is the ICI coefficient representing the ICI power level from the $l^{th}$ sub-carrier on the sub-carrier:

$$c_{l-i} = \frac{1}{N} \frac{\sin\pi(l-i+\Delta fT)}{\sin\pi\left(\frac{l-i+\Delta FT}{N}\right)} \times \exp j\pi \frac{(N-1)(l-i+\Delta fT)}{N} \quad \text{Equation 9}$$

A major reason that past proposed ICI cancellation schemes have not solved the ICI problem is the lack of a suitable channel model for addressing the ICI problem in multi-carrier wireless communication systems.

Other features and advantages of the present invention will become apparent from the following detailed description, taken in conjunction with the accompanying drawings, illustrating by way of example the principles of the present invention.

A detailed description of the iterative channel estimation method and system to which this method is applied, are now provided.

In the present invention a more accurate channel model is provided. This is a new model in which the basic idea is modelling the frequency domain channel features (ICI included) as having two parts: a first part comprising multiple fixed matrices and a part comprising unfixed variables. The unfixed variables are estimated via the pilots. The more fixed matrices that are used, the more accurately the channel is estimated. Moreover, the unfixed variables can be estimated by a linear algorithm.

Figure 1:
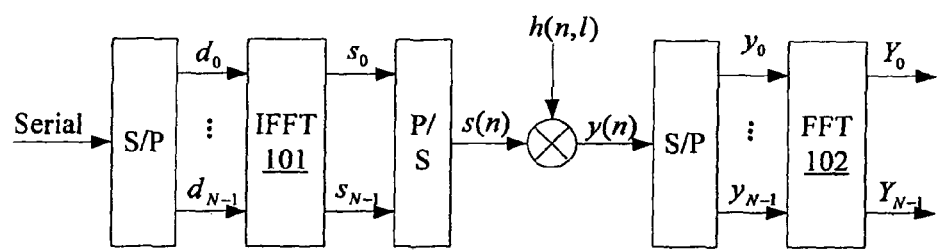
FIG. 1 illustrates a conventional OFDM system model.
Figure 2:
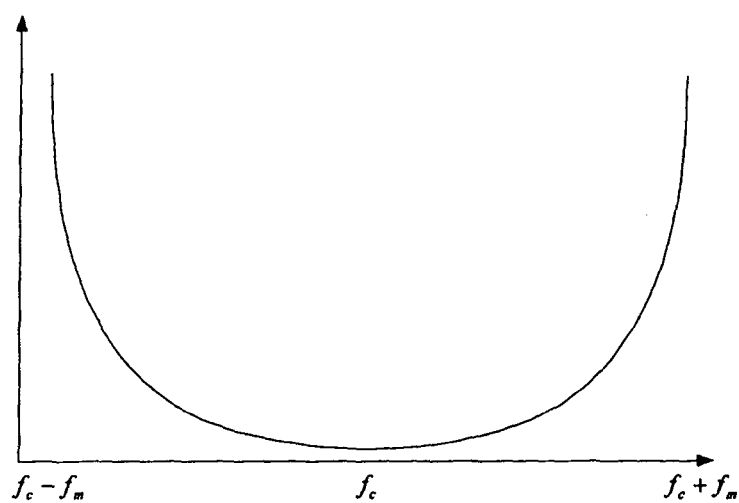
FIG. 2 illustrates the spectrum shape of a Doppler spread.
Figure 3:
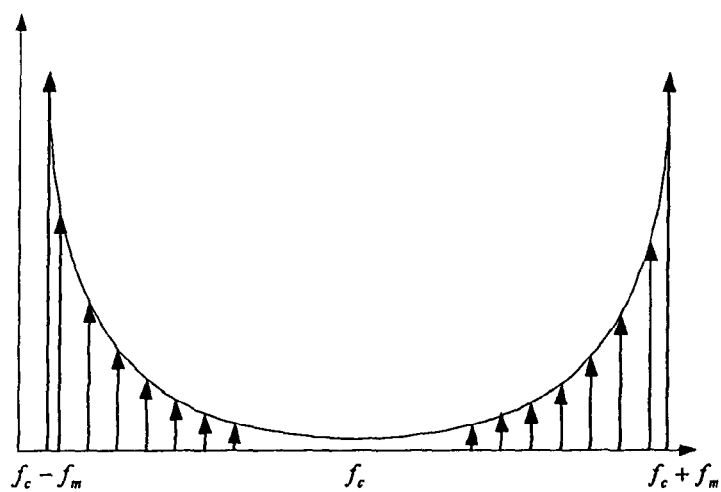
FIG. 3 illustrates segmentation of the Doppler spectrum spread.

The Doppler spectrum spread (range from $f_c-f_m$ to $f_c+f_m$) is divided into many small segments during which the channel impulse response remains almost the same. For each segment, the channel model in Equation 9 serves as a baseline. First, channel impulse response is described for every segment by employing fixed matrices and unfixed variables to approximate Equation 9. By combining all segments, the channel impulse response on the whole Doppler spectrum spread is achieved. If the segmented Doppler spread is small enough, the corresponding channel response can be treated as an impulse function in the frequency domain, as shown in FIG. 3.

For each segment, the received signal is:

$$y(n) = \sum_{l=0}^{L} h(l)\exp(j\Delta fn)s(n-l) + w(n)$$

where $\Delta f$ is the unitary frequency offset for the segmentation, and h(l) is the time domain channel parameters within one OFDM symbol. The unfixed variables and fixed matrices are divided into L groups, where L is the maximum multipath number and every group includes T variables/matrices.

After the FFT operation at the receiver side, the received frequency domain signal is:

$$Y = \sum_{l=0}^{L} h(l)[E_l X + CE_l X] \quad \text{Equation 10}$$

where $$Y = \begin{bmatrix} Y_0 \\ Y_1 \\ \vdots \\ Y_{N-1} \end{bmatrix}$$

is the received signals in frequency domain, $$X = \begin{bmatrix} X_0 \\ X_1 \\ \vdots \\ X_{N-1} \end{bmatrix}$$

is the transmitted signals in the frequency domain, $$E_l = \begin{bmatrix} \exp(-j2\pi l \cdot 0/N) & 0 & \cdots & 0 \\ 0 & \exp(-j2\pi l \cdot 1/N) & \cdots & 0 \\ \vdots & \vdots & \ddots & \vdots \\ 0 & 0 & \cdots & \exp(-j2\pi l \cdot (N-1)/N) \end{bmatrix}$$

is the phase rotation matrix resulting from propagation delay and $$C = \begin{bmatrix} 0 & c_1 & c_2 & \cdots & c_{N-1} \\ c_{-1} & 0 & c_1 & \cdots & c_{N-2} \\ c_{-2} & c_{-1} & 0 & \cdots & c_{N-3} \\ \vdots & \vdots & \vdots & \ddots & \vdots \\ c_{-(N-1)} & c_{-(N-2)} & c_{-(N-3)} & \cdots & 0 \end{bmatrix}$$

is the matrix representing ICI, in which $c_s$ is described in Equation 9. As derived in Appendix A, $$c_s \approx \sum_{t=0}^{T} f_t(\Delta f) ctg'(\pi s/N)(ctg(\pi s/N) - j) \quad \text{Equation 11}$$

where T is the rank number used to describe the ICI. The bigger T is, the more accurate Equation 11 is. Therefore, Equation 11 can be rewritten as:

$$Y = \sum_{l=0}^{L} \left( h_0(l) E_l X + \sum_{t=1}^{T} h_t(l) C_t E_l X \right) \quad \text{Equation 12}$$

where $h_t(l)$ is the unfixed variables including the channel impulse response and Doppler frequency offset for a corresponding segment, $$C_t = \begin{bmatrix} 0 & c_1^t & c_2^t & \cdots & c_{N-1}^t \\ c_{-1}^t & 0 & c_1^t & \cdots & c_{N-2}^t \\ c_{-2}^t & c_{-1}^t & 0 & \cdots & c_{N-3}^t \\ \vdots & \vdots & \vdots & \ddots & \vdots \\ c_{-(N-1)}^t & c_{-(N-2)}^t & c_{-(N-1)}^1 & \cdots & 0 \end{bmatrix},$$

and $$c_s^t = ctg'(\pi s/N)(ctg(\pi s/N) - j).$$

The matrices $C_t E_l (0 \leq t \leq T)$ of one path are the progressional spread of ICI, and t is the progressional rank. Usually the variables corresponding to lower rank matrices are larger than the variables corresponding to the higher rank matrices, i.e., $h_{t1}(l) > h_{t2}(l) (t_1 < t_2)$.

Combining all the segmentations of the Doppler spread, a practical channel model is achieved. The matrices $C_t$ and $E_l$ are fixed and only the $h_t(l)$'s are altered along with segmentations. Therefore, the format of the proposed channel model on the whole Doppler spread is the same as Equation 12, the only difference lies in $h_t(l)$.

In order to use Equation 12 to describe the channel features, a total of (L+1)(T+1) variables of ($h_t(l)$) have to be estimated. A basic linear estimation algorithm is provided as an example only of how to obtain the variables $h_t(l)$, since other algorithms providing the same result can be used. This linear estimation algorithm can be used to estimate the variables if one OFDM symbol includes (L+1)(T+1) pilots signals (or more). The example of a basic linear estimation scheme is described below.

Let the transmitted data have a zero value to construct:

$$X = [P_0 0 \ldots 0 P_1 0 \ldots 0 \ldots P_{(L+1)(T+1)-1}]^T$$

where $P_s$ is a pilot signal and $[\ldots]^T$ is the matrix transposition operator. Correspondingly, the received Pilot signals in the frequency domain are:

$$Y = [y_0 0 \ldots 0 y_1 0 \ldots 0 \ldots y_{(L+1)(T+1)-1}]^T$$

Substituting X and Y into Equation 12 results in a system of (L+1)(T+1) linear equations. Then the variables are derived by solving this set of linear equations, which means low processing delay and achievable performance, especially under high SNR condition.

The present invention provides the above new channel model comprising multiple fixed matrices and unfixed variables, as shown in Equation 12 which describes the channel response, where a total of (L+1)(T+1) variables ($h_t(l)$) are estimated.

Figure 4:
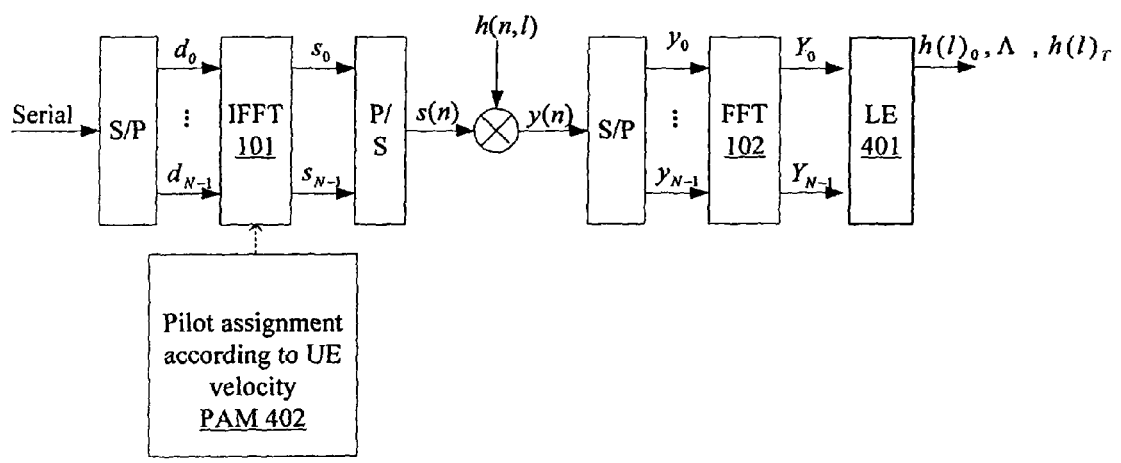
FIG. 4 illustrates an OFDM system modified according to the present invention to include a linear estimation module that estimates the channel features, according to an exemplary embodiment of the present invention.

Referring now to FIG. 4, an exemplary embodiment of an OFDM system according to the present invention is illustrated in which the receiver comprises means to implement a channel estimation scheme that is diagrammatically shown by the block E 501. In the present invention an OFDM system transmit blocks of N symbols where the shape and size of the block processed on reception is free, in order to best match block size to the system architecture. Further, the OFDM system assigns L groups of pilots for each UE where L is the maximum multi-path delay, according to the distributed pilot allocation scheme of the present invention. Maximum rank number T is the number of variables/matrices included in each group.

The purpose of the invention is to provide a radio channel model suitable for ICI estimation and cancellation in multi-carrier systems. FIG. 4 illustrates an exemplary embodiment of an OFDM system modified in accordance with the present invention. In order to perform the linear estimation algorithm to obtain the channel variables, the data parts of transmitted signals X are set to zero so that only pilot signals $X_p$ are sent by the transmission side to the receiver side of the system and are received thereby as $Y_p$.

The channel estimation is conducted in module LE 401. The pilot format and position is assigned according to the UE mobility, and then the pilots are inserted into OFDM symbol before IFFT module PAM 402.

The pilots are assigned to UEs by high layers Pilot Assignment Module 402 and the receiver side demodulates received pilot-only signals using the Fast Fourier Transform 102. Then, according to an exemplary embodiment, a linear estimation module LE 401 can be used to solve a system of (L+1)(T+1) equations, assuming that one OFDM symbol includes (L+1)(T+1) pilots signals (or more)). The example of a basic linear estimation scheme is described below.

Let the transmitted data have a zero value to construct:

$$X = [P_0 0 \ldots 0 P_1 0 \ldots 0 \ldots P_{(L+1)(T+1)-1}]^T$$

where $P_s$ is a pilot signal and $[\ldots]^T$ is the matrix transposition operator. Correspondingly, the received Pilot signals in the frequency domain are:

$$Y = [y_0 0 \ldots 0 y_1 0 \ldots 0 \ldots y_{(L+1)(T+1)-1}]^T$$

Substituting X and Y into Equation 12 results in a system of (L+1)(T+1) linear equations. Then the variables to describe the channel features, a total of (L+1)(T+1) variables of ($h_t(l)$) are derived by solving this set of linear equations, which means low processing delay and achievable performance, especially under high SNR condition. Module LE 401 solves these linear equations and outputs ($h_t(l)$).

While exemplary embodiments of the present invention have been provided, one skilled in the art will realize that the invention is not limited to the specific details and exemplary embodiments shown and described herein. Accordingly, various modifications may be made thereto without departing from the spirit or scope of the general inventive concept as defined by the appended claims and their equivalents.

APPENDIX A $$c_s = \frac{1}{N}\left(1 - jtg\frac{\Delta fT\pi}{N}\right)\frac{\sin\pi\Delta fT \exp(-j\pi s/N)\exp(j\pi\Delta fT)}{\sin(s\pi/N) + \cos(s\pi/N)tg\frac{\Delta fT\pi}{N}}$$

$$= F(\Delta fT, N)\frac{1 - jtg(s\pi/N)}{tg(s\pi/N) + tg\frac{\Delta fT\pi}{N}}$$

$$= F(\Delta fT, N)\frac{ctg(s\pi/N) - j}{1 + tg\frac{\Delta fT\pi}{N}ctg(s\pi/N)}$$

$$ctg\frac{\Delta fT\pi}{N}ctg(s\pi/N) \ll 1 = F(\Delta fT, N)$$

$$\frac{\left(\sum_{t=0}^{\infty}(-1)^t tg^t\frac{\Delta fT\pi}{N}ctg^t(s\pi/N)\right)}{(ctg(s\pi/N) - j)}$$

$$= \sum_{t=0}^{\infty}f_t(\Delta fT, N)ctg^t(s\pi/N)$$

$$(ctg(s\pi/N) - j)$$

where $F(\Delta fT, N)$ is a function of $\Delta fT$ and N:

$$f_t(\Delta fT, N) = \frac{1}{N}\left(1 - jtg\frac{\Delta fT\pi}{N}\right)\sin\pi\Delta fT\exp(j\pi\Delta fT)(-1)^t tg^t\frac{\Delta fT\pi}{N}$$

What is claimed is:

1. A method for a channel model for a multi-carrier wireless communication system, comprising:
    in a receiver, cancelling interference in a received signal by describing the channel to include a plurality of fixed matrices and an equal-numbered plurality of unfixed variables, the fixed matrices being characterized as a at least a portion of a frequency-spectrum spread of the interference, the interference including inter-carrier interference (ICI); and
    pairing of each of the described plurality of unfixed variables, one-to-one with one of the described plurality of fixed matrices.

2. The method of claim 1, further comprising dividing the unfixed variables and fixed matrices into L groups such that every group includes T unfixed variables paired with T fixed matrices, wherein, L is the maximum multi-path number and T is a positive integer.

3. The method of claim 2, further comprising describing channel features of one path with one divided group.

4. The method of claim 3, further comprising defining the fixed matrices of the described one divided as a progressional spread of the interference, the interference including ICI.

5. The method of claim 4,
wherein the multi-carrier wireless system is an orthogonal frequency division multiplexing (OFDM) system; and further comprising dividing a Doppler Spectrum spread range for the received signal into a plurality of segments each small enough such that the corresponding channel response can be treated as an impulse function in the frequency domain, and such for each segment, the received signal is:

$$y(n) = \sum_{l=0}^{L} h(l)\exp(j\Delta fn)s(n-l) + w(n)$$

where $\Delta f$ is the unitary frequency offset for the segmentation, $h(l)$ is the time domain channel parameters within one OFDM symbol.

6. The method of claim 5, further comprising;
performing an FFT operation at a receiver in the system, the received frequency domain signal is:

$$Y = \sum_{l=0}^{L} h(l)[E_l X + CE_l X] \qquad \text{Equation A}$$

where $$Y = \begin{bmatrix} Y_0 \\ Y_1 \\ \vdots \\ Y_{N-1} \end{bmatrix}$$

is the received signals in the frequency domain, $$X = \begin{bmatrix} X_0 \\ X_1 \\ \vdots \\ X_{N-1} \end{bmatrix}$$

is the transmitted signals in the frequency domain, $$E_l = \begin{bmatrix} \exp(-j2\pi l \cdot 0/N) & 0 & \cdots & 0 \\ 0 & \exp(-j2\pi l \cdot 1/N) & \cdots & 0 \\ \vdots & \vdots & \ddots & \vdots \\ 0 & 0 & \cdots & \exp(-j2\pi l \cdot (N-1)/N) \end{bmatrix}$$

is the phase rotation matrix resulting from propagation delay and $$C = \begin{bmatrix} 0 & c_1 & c_2 & \cdots & c_{N-1} \\ c_{-1} & 0 & c_1 & \cdots & c_{N-2} \\ c_{-2} & c_{-1} & 0 & \cdots & c_{N-3} \\ \vdots & \vdots & \vdots & \ddots & \vdots \\ c_{-(N-1)} & c_{-(N-2)} & c_{-(N-3)} & \cdots & 0 \end{bmatrix}$$

is the matrix representing ICI, in which $c_s$ is described in the following Equation B:

$$c_s \approx \sum_{t=0}^{T} f_t(\Delta f) ctg^t(\pi s/N)(ctg(\pi s/N) - j), \qquad \text{Equation B}$$

the described one divided group defines the channel according to the following Equation C:

$$Y = \sum_{l=0}^{L} \left( h_0(l) E_l X + \sum_{t=1}^{T} h_t(l) C_t E_l X \right) \qquad \text{Equation C}$$

wherein, $h_t(l)$ represents the unfixed variables including the channel impulse response and Doppler frequency offset for a corresponding segment, $$C_t = \begin{bmatrix} 0 & c_1^t & c_2^t & \cdots & c_{N-1}^t \\ c_{-1}^t & 0 & c_1^t & \cdots & c_{N-2}^t \\ c_{-2}^t & c_{-1}^t & 0 & \cdots & c_{N-3}^t \\ \vdots & \vdots & \vdots & \ddots & \vdots \\ c_{-(N-1)}^t & c_{-(N-2)}^t & c_{-(N-1)}^t & \cdots & 0 \end{bmatrix},$$

$c_s^t = ctg^t(\pi s/N)(ctg(\pi s/N)-j)$, the matrices $C_t E_t (0 \le t \le T)$ of the one path are the progressional spread of ICI, and t is the progressional rank.

7. The method of claim 5, further comprising increasing T to facilitate a more accurate determination of ICI via Equation C.

8. The method of claim 6, further comprising estimating the variables $h_t(l)$ using a linear estimation algorithm.

9. The method of claim 7, further comprising, in response to the variables of one OFDM symbol including at least $(L+1)(T+1)$ pilot signals, using the linear estimation algorithm by:
letting the data have a zero value to construct:

$$X = [P_0 0 \ldots 0 P_1 0 \ldots 0 \ldots P_{(L+1)(T+1)-1}]^T$$

where $P_s$ is pilot signal, $[\ ]^T$ is the transpose operator and the corresponding received signals are:

$$Y = [y_0 0 \ldots 0 y_1 0 \ldots 0 \ldots y_{(L+1)(T+1)-1}]^T$$

$[\ ]^T$ is the transpose operator; and
substituting X and Y into Equation C, achieving $(L+1)(T+1)$ equations and determining the $h_t(l)$ variables by solving this set of simultaneous linear equations.

10. The method of claim 4, wherein the multi-carrier system is from the group consisting of OFDM, SC-FDMA, MC-CDMA.

11. For use in a multi-carrier wireless communication system having a maximum multi-path number of L and that includes a plurality of User Equipment (UE), a system comprising:
   a pilot assignment module configured and arranged to effect pilot allocation by high layers of L groups of pilots to each UE of said plurality of UEs; and
   a receiver configured and arranged to receive a signal via the wireless communication system and the receiving including a channel estimation module configured and arranged with a channel model that includes a plurality of fixed matrices and an equal-numbered plurality of unfixed variables paired one-to-one such that each of the plurality of unfixed variables is paired with a different one of the plurality of fixed matrices that are characterized as a at least a portion of a frequency-spectrum spread of interference in the received signal, the interference including inter-carrier interference (ICI).

12. The system of claim 11, wherein the unfixed variables and fixed matrices are divided into L groups such that every group includes T unfixed variables paired with T fixed matrices, wherein, T is a positive integer.

13. The system of claim 12, wherein channel features of one path are described by one divided group.

14. The system of claim 13, wherein the fixed matrices of the one divided group characterize a progressional spread of ICI.

15. The system of claim 14, wherein:
   the multi-carrier wireless system is an orthogonal frequency division multiplexing (OFDM) system; and
   the channel estimation module uses a Doppler spectrum spread range divided into a plurality of segments each small enough such that the corresponding channel response can be treated as an impulse function in the frequency domain, and such for each segment, the received signal is:

$$y(n) = \sum_{l=0}^{L} h(l)\exp(j\Delta fn)s(n-l) + w(n)$$

where $\Delta f$ is the unitary frequency offset for the segmentation and $h(l)$ is the time domain channel parameters within one OFDM symbol.

16. The system of claim 15, including a receiver circuit configured and arranged to perform an FFT operation on the received frequency domain signal in accordance with Equation A as follows:

$$Y = \sum_{l=0}^{L} h(l)[E_l X + CE_l X] \quad \text{Equation A}$$

where $$Y = \begin{bmatrix} Y_0 \\ Y_1 \\ \vdots \\ Y_{N-1} \end{bmatrix}$$

is the received signals in the frequency domain, $$X = \begin{bmatrix} X_0 \\ X_1 \\ \vdots \\ X_{N-1} \end{bmatrix}$$

is the transmitted signals in the frequency domain, $$E_l \begin{bmatrix} \exp(-j2\pi l \cdot 0/N) & 0 & \cdots & 0 \\ 0 & \exp(-j2\pi l \cdot 1/N) & \cdots & 0 \\ \vdots & \vdots & \ddots & \vdots \\ 0 & 0 & \cdots & \exp(-j2\pi l \cdot (N-1)/N) \end{bmatrix}$$

is the phase rotation matrix resulting from propagation delay and $$C = \begin{bmatrix} 0 & c_1 & c_2 & \cdots & c_{N-1} \\ c_{-1} & 0 & c_1 & \cdots & c_{N-2} \\ c_{-2} & c_{-1} & 0 & \cdots & c_{N-3} \\ \vdots & \vdots & \vdots & \ddots & \vdots \\ c_{-(N-1)} & c_{-(N-2)} & c_{-(N-3)} & \cdots & 0 \end{bmatrix}$$

is the matrix representing ICI, in which $c_s$ is described in the following Equation B:

$$c_s \approx \sum_{t=0}^{T} f_t(\Delta f) ctg^t(\pi s/N)(ctg(\pi s/N) - j), \quad \text{Equation B}$$

in which the described one divided group defines the channel according to the following Equation C:

$$Y = \sum_{l=0}^{L} \left( h_0(l) E_l X + \sum_{t=1}^{T} h_t(l) C_t E_l X \right) \quad \text{Equation C}$$

wherein, $h_t(l)$ represents the unfixed variables including the channel impulse response and Doppler frequency offset for a corresponding segment, $$C_t = \begin{bmatrix} 0 & c_1^t & c_2^t & \cdots & c_{N-1}^t \\ c_{-1}^t & 0 & c_1^t & \cdots & c_{N-2}^t \\ c_{-2}^t & c_{-1}^t & 0 & \cdots & c_{N-3}^t \\ \vdots & \vdots & \vdots & \ddots & \vdots \\ c_{-(N-1)}^t & c_{-(N-2)}^t & c_{-(N-1)}^t & \cdots & 0 \end{bmatrix},$$

$c_s^t = ctg^t(\pi s/N)(ctg(\pi s/N)-j)$, in which the matrices $C_t E_l$ ($0 \le t \le T$) of the one path are the progressional spread of ICI, and t is the progressional rank.

17. The system of claim 16, wherein the receiver circuit is configured and arranged to make T larger to facilitate a more accurate determination of ICI via Equation C.

18. The system of claim 17, wherein the receiver circuit further comprises a linear estimation module that estimates the variables $h_t(l)$ using a linear estimation algorithm.

19. The system of claim 18, wherein the receiver circuit is configured and arranged to, in response to the variables of one OFDM symbol including (L+1)(T+1) pilot signals or more, implement the linear estimation algorithm in accordance with the following:

let the data have a zero value to construct:

$$X = [P_0 0 \ldots 0 P_1 0 \ldots 0 \ldots P_{(L+1)(T+1)-1}]^T$$

where $P_s$ is pilot signal, $[\ ]^T$ is the transpose operator and the corresponding received signals are:

$$Y = [y_0 0 \ldots 0 y_1 0 \ldots 0 \ldots y_{(L+1)(T+1)-1}]^T$$

$[\ ]^T$ is the transpose operator; and substituting X and Y into Equation C to achieve (L+1)(T+1) equations and determining the $h_t(l)$ variables by solving this set of simultaneous linear equations.

20. The system of claim 11, wherein the multi-carrier system is from the group consisting of OFDM, SC-FDMA, MC-CDMA.

* * * * *